Jan. 26, 1954
C. DOWNING
2,667,511
PROCESS FOR PRODUCING ALKYL-SUBSTITUTED ACYLAMIDES
Filed Aug. 25, 1951
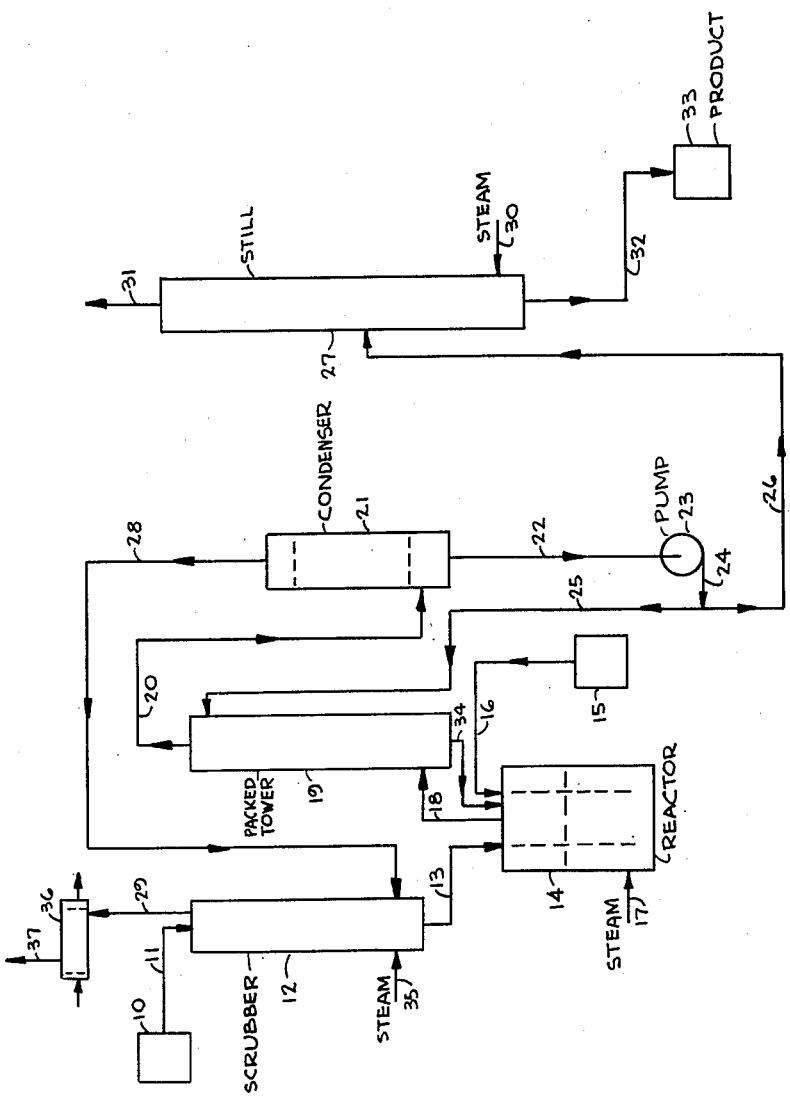
*INVENTOR.*
COLE DOWNING
BY *Herman O. Bauermeister*
*attorney*

Patented Jan. 26, 1954

2,667,511

UNITED STATES PATENT OFFICE 2,667,511

PROCESS FOR PRODUCING ALKYL-SUBSTITUTED ACYLAMIDES

Cole Downing, Decatur, Ala., assignor, by mesne assignments, to The Chemstrand Corporation, a corporation of Delaware Application August 25, 1951, Serial No. 243,685

11 Claims. (Cl. 260—561)

This invention relates to a process for the manfacture of alkyl-substituted acylamides.

It is an object of this invention to provide a method by which alkyl-substituted acylamides may be produced without the formation of azeotropes.

It is a further object of the invention to prepare acylamides such as dimethyl acetamide, by an efficient process and obtain the same in a high degree of purity. Other objects of the invention will become apparent as the description proceeds.

The production of dimethyl acylamides is described in an article by Ruhoff and Reid entitled "A Series of Aliphatic Dimethylamides" 59 JACS 401 (1937).

According to these authors the dimethyl acylamides are prepared by the reaction of a carboxylic acid and dimethylamine and the products are recovered from the reaction mixture as an azeotrope which boils uniformly 4° to 5° C. above the boiling points of the pure acylamides. The boiling points and compositions of the azeotropes occurring in this system are identified by these authors as follows:

|  | Boiling Point, °C. | Percent Amide | Percent Acid |
|---|---|---|---|
| Dimethyl acetamide+acetic acid 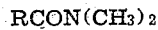 | 170.8–170.9 | 77.2 | 21.1 |
| Dimethyl propionamide+propionic acid | 179.2–179.4 | 75.8 | 23.4 |
| Dimethyl butyramide+butyric acid | 129.9–130.0 | 66.1 | 32.0 |

As a result of the occurrence of the above azeotropes it is difficult to purify these compounds. As a matter of fact, the existence of the above azeotropes remained undiscovered for a number of years. As pointed out by the above authors the acid present in the azeotropes can be removed by treatment with solid caustic soda followed by distillation.

It has now been found that dimethyl acetamides of the formula:

RCON(CH₃)₂ where R is an alkyl radical having from 1 to 3 carbon atoms may be prepared by adding dimethylamine and an acyl compound selected from the group consisting of acetic acid, propionic acid and butyric acid or the corresponding anhydrides, to a body comprising dimethyl acylamide and the corresponding acid, in which body the proportion of the acid is less than that corresponding to the azeotrope thereof.

The reaction occurring in the process when employing acetic acid may be written as follows:

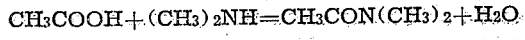

the reaction requiring one mole of acetic acid to one mole of dimethylamine and producing one mole of dimethyl acetamide together with one mole of water.

When working with the corresponding anhydride the reaction is as follows:

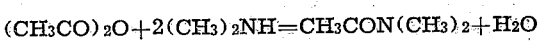

wherein one mole of acetic anhydride is reacted with two moles of dimethylamine to form one mole of acylamide and one mole of water. It is, of course, apparent that the water serves to hydrolyze the acid anhydride to the acid.

While ordinarily the stoichiometric proportions of dimethylamine to acid or anhydride are as indicated by the equations written above, I have found that the proportions of dimethylamine with respect to acid and/or acid anhydride may be advantageously maintained so as to afford somewhat of an excess thereof over the exact stoichiometric proportions. The excess amine which is not reacted is not lost, since the present process provides a novel method by which substantially all of the amine is retained in the process.

The process of the invention will be apparent from the following description when read in connection with the drawing, the single figure of which illustrates diagrammatically an assembly of apparatus suitable for carrying out the process. In the following description the process is described as applied to the preparation of N,N-dimethyl acetamide from acetic acid and dimethylamine. However, it is apparent that the same process may be carried out for any of the other dimethylacylamides herein disclosed.

In the drawing, 10 indicates a tank containing glacial acetic acid, 11 a pipe for conveying the same to a packed scrubber 12, through which it flows leaving the same by pipe 13 and then flowing into reactor 14.

Numeral 15 indicates a tank containing dimethylamine. A pipe 16 connects this tank with reactor 14 permitting the dimethylamine to flow thereto. It is preferred to vaporize the dimethylamine prior to introduction into the reactor. Reactor 14 is provided with a stirrer and also with steam coils which are not shown. However, the coils are connected to a steam source 17 whereby the contents of the reactor may be heated to the boiling point. A vapor conductor 18 connects with packed tower 19, the latter in turn being provided with a vapor pipe 20. The upper end of the packed tower 19 is connected by pipe 20 with water-cooled condenser 21, the liquid condensate forming therein flowing by pipe 22 to pump 23. The discharge of the pump flows by pipe 24 to pipes 25 and 26, the former connecting with the upper part of packed tower 19 and the latter pipe with still 27. The upper part of condenser 21 is connected by pipe 28 with the lower part of scrubber 12, the upper part of the latter being connected to condenser 36 and then vented by pipe 37. Still 27, which serves as a light ends column, is provided with a steam coil supplied with steam by pipe 30, a vent 21 and a product discharge 32.

Example 1

In carrying out my process in the above-described apparatus, reactor 14 is first filled approximately one-half full with a mixture of dimethyl acetamide and acetic acid, the content of acetic acid being below that present in the azeotrope. A convenient composition to be employed in reactor 14 consists of a mixture of 88% of dimethyl acetamide and 12% of acetic acid.

The mixture of dimethyl acetamide and acetic acid in reactor 14 is heated to the boiling point (162°–165° C.) while a supply of acetic acid from tank 10 is introduced via pipe 11, scrubber 12 and pipe 13, the acid preferably being introduced below the level of the liquid in reactor 14. At the same time a stream of dimethylamine from tank 15 is passed into reactor 14 via pipe 16. The amount of dimethylamine is supplied in excess of the stoichiometric proportion of dimethylamine entering by pipe 13, however it is substantially equivalent to the acetic acid entering the system by pipe 11.

The vaporized reaction product formed in the reactor passes out by pipe 18 into packed tower 19 and then passes by pipe 20 into condenser 21 where most of the product is condensed. The condensate leaves the condenser by pipe 22 and then by pump 23 a part thereof is returned to packed tower 19 by pipe 25. The condensate so returned serves as reflux therein, ultimately returning to reactor 14 by pipe 34. The uncondensed vapor leaving condenser 21 by pipe 28 and consisting largely of unreacted dimethylamine passes into scrubber 12 where it is absorbed by the acetic acid therein.

Scrubber 12 is maintained at a temperature somewhat above 150° C. and preferably below 165° C. This temperature is maintained by the heat of reaction between the dimethylamine entering by pipe 28 and acetic acid supplied by pipe 11. For starting up purposes only, heat may be supplied to scrubber 12 by passing steam into the scrubber by pipe 35 or a heating jacket may be provided for accomplishing the same purpose. Such heating means may also be useful when excessive heat loss occurs from the scrubber. When the process is operated as herein-described, approximately 60% of the reaction forming the acylamides takes place in scrubber 12, with the balance taking place in reactor 14 and in tower 19.

It has been found that commercial dimethylamine contains small amounts of impurities such as mono- and tri-methylamine together with varying amounts of inerts. The trimethylamine and the inerts are not reacted with the acid, hence they are vented from the system by means of pipe 29. This pipe leads to water-cooled condenser 36, wherein condensation and return of any vaporized acetic acid to the scrubber is effected. The trimethylamine and inerts are vented from the condenser by means of pipe 37.

The part of the condensate delivered by pump 23 into pipe 24 which is not returned as reflux is passed into pipe 26 and then into still 27. In still 27 most of the light ends present in the crude dimethyl acetamide are removed by heating the product to a vapor temperature of about 95° C. The light ends consisting of water and small amounts of dimethylamine are vented by pipe 31. If substantial quantities of dimethylamine are vaporized at this point a separation thereof from water may be made and the dimethylamine returned to scrubber 12. The liquid product from still 14 leaving by pipe 32 flows to storage tank 33. This is the product of the process.

Any monomethylamine present as an impurity in the dimethylamine forms the corresponding monomethyl acylamide. This product has a substantially higher boiling point than does the dimethyl acylamide and for this reason is retained in the reactor 14. When the reactor contents have accumulated substantial amounts of the monomethyl acylamide, they are withdrawn and purified by an ordinary fractional distillation.

Example 2

One thousand parts by weight of propionic acid and 670 parts of dimethylamine are charged to the system, comprising scrubber 12 and reactor 14 connected to packed column 19 and condenser 21, as described in Example 1. The reactor contains a previously prepared mixture of 960 parts of dimethyl propionamide and 170 parts of propionic acid. After the completion of the primary reaction the reaction mixture is volatilized, as described in Example 1, the vapor entering the packed column and contacting reflux obtained from the condenser 21. The crude product thus obtained is then distilled to yield substantially pure dimethyl propionamide in good yield.

Example 3

Eighty-eight parts by weight of butyric acid and 50 parts of dimethylamine are continuously charged to the system comprising scrubber 12, and reactor 14 connected to packed tower 19 and condenser 21, as described in Example 1. The reactor contains a previously prepared mixture of 66 parts by weight of dimethylbutyramide and 16 parts of butyric acid. After the completion of the primary reaction the reaction mixture is volatilized as described in Example 1, and the vapor passed through packed tower 19 where it is connected with reflux from condenser 21. The crude product is then distilled to give dimethylbutyramide.

I claim:

1. The method of manufacturing a dimethylacylamide of the formula:

$$RCON(CH_3)_2$$

where R is an alkyl radical having from 1 to 3 carbon atoms which comprises adding dimethylamine and an acyl compound selected from the group consisting of acetic acid, propionic acid, butyric acid and the corresponding anhydrides thereof to a body of liquid comprising dimethylacylamide and the corresponding acid containing the acyl radical of the desired acylamide, the proportion of said acid with respect to said dimethylacylamide present in said body being less than that corresponding to the azeotrope thereof.

2. The method of manufacturing a dimethylacylamide of the formula:

$$RCON(CH_3)_2$$

where R is an alkyl radical having from 1 to 3 carbon atoms which comprises adding dimethylamine and an acyl compound selected from the group consisting of acetic acid, propionic acid, butyric acid and the corresponding anhydrides thereof in such proportion that the dimethylamine is at least equal to the stoichiometric proportion required by the reaction, to a body of liquid comprising dimethylacylamide and the corresponding acid containing the acyl radical of the desired acylamide, in which body the proportion of said acid with respect to said dimethylacylamide is less than that corresponding to the azeotrope thereof.

3. The method of manufacturing dimethylacetamide which comprises introducing dimethylamine and acetic acid to a body of liquid comprising dimethylacetamide and acetic acid, the proportion of acetic acid in said body being less than 21.1% by weight.

4. The method of manufacturing dimethylacetamide which comprises introducing dimethylamine and acetic anhydride to a body of liquid comprising dimethylacetamide and acetic acid, the proportion of acetic acid in said body being less than 21.1% by weight.

5. The method of manufacturing dimethylacetamide which comprises introducing dimethylamine and acetic acid in such proportion that the dimethylamine is at least equal to the stoichiometric proportion required by the reaction to a body of liquid comprising dimethylacetamide and acetic acid, in which body the concentration of said acid based on said dimethylacetamide and acetic acid is less than 21.1% by weight.

6. The method of manufacturing dimethylpropionamide which comprises introducing dimethylamine and propionic acid to a body of liquid comprising dimethylpropionamide and propionic acid, the proportion of propionic acid in said body being less than 23.4% by weight.

7. The method of manufacturing dimethylpropionamide which comprises introducing dimethylamine and propionic acid in such proportion that the dimethylamine is at least equal to the stoichiometric proportion required by the reaction to a body of liquid comprising dimethylpropionamide and propionic acid, in which body the concentration of said acid based on said dimethylpropionamide and propionic acid is less than 23.4% by weight.

8. The method of manufacturing dimethylbutyramide which comprises introducing dimethylamine and butyric acid to a body of liquid comprising dimethylbutyramide and butyric acid, the proportion of butyric acid in said body being less than 32% by weight.

9. The method of manufacturing dimethylbutyramide which comprises introducing dimethylamine and butyric acid in such proportions that the dimethylamine is at least equal to the stoichiometric proportion required by the reaction to a body of liquid comprising dimethylbutyramide and butyric acid, in which body the concentration of said acid based on said dimethylbutyramide and butyric acid is less than 32% by weight.

10. A method for manufacturing a dimethylacylamide of the formula:

$$RCON(CH_3)_2$$

wherein R is an alkyl radical having from one to 3 carbon atoms, which comprises adding dimethylamine and an acyl compound selected from the group consisting of acetic acid, propionic acid, butyric acid and the corresponding anhydrides thereof to a body of liquid in a reaction zone comprising dimethylacylamide and the corresponding acid containing the acyl radical of the desired acylamide, the proportion of said acid with respect to said dimethylacylamide present in said body being less than that corresponding to the azetrope thereof, said body of liquid being heated to the boiling point, said acid being passed through a scrubbing zone prior to entering the reaction zone, condensing the vaporized reaction product, and returning a portion of the condensate to the reaction zone, all of said steps being maintained so that the major portion of the reaction takes place in the scrubbing zone and the balance takes place in the reaction zone.

11. A method for manufacturing dimethylacetamide which comprises adding dimethylamine and acetic acid in such proportion that the dimethylamine is at least equal to the stoichiometric proportion required by the reaction to a body of liquid in a reaction zone comprising dimethylacetamide and acetic acid, in which body the concentration of said acid based on said dimethylacetamide and acetic acid is less than 21.1% by weight, said body of liquid being heated to the boiling point, said acid being passed through a scrubbing zone at a temperature of 150° to 165° C. prior to entering the reaction zone, condensing the vaporized reaction product, and returning a portion of the condensate to the reaction zone, all of said steps being maintained so that 60% of the reaction takes place in the scrubbing zone and the balance takes place in the reaction zone.

COLE DOWNING.

References Cited in the file of this patent

UNITED STATES PATENTS

| Number | Name | Date |
|---|---|---|
| 1,954,433 | Thomas et al. | Apr. 10, 1934 |
| 1,986,854 | Reid | Jan. 8, 1935 |
| 2,213,763 | Gordon | Sept. 3, 1940 |